No. 838,315. PATENTED DEC. 11, 1906.
W. GEIPEL & F. M. T. LANGE.
CONTROL OF ELECTRIC MOTORS.
APPLICATION FILED JAN. 15, 1906.

5 SHEETS—SHEET 1.

Witnesses
W Henry Simms
E. Clough

Inventors
W Geipel
F M T Lange
Attorney

No. 838,315. PATENTED DEC. 11, 1906.
W. GEIPEL & F. M. T. LANGE.
CONTROL OF ELECTRIC MOTORS.
APPLICATION FILED JAN. 15, 1906.

5 SHEETS—SHEET 4.

No. 838,315. PATENTED DEC. 11, 1906.
W. GEIPEL & F. M. T. LANGE.
CONTROL OF ELECTRIC MOTORS.
APPLICATION FILED JAN. 15, 1906.

5 SHEETS—SHEET 5.

UNITED STATES PATENT OFFICE.

WILLIAM GEIPEL AND FREDERICK MONTAGUE TOWNSHEND LANGE, OF SOUTHWARK, ENGLAND.

CONTROL OF ELECTRIC MOTORS.

No. 838,315.  Specification of Letters Patent.  Patented Dec. 11, 1906.

Application filed January 15, 1906. Serial No. 296,098.

*To all whom it may concern:*

Be it known that we, WILLIAM GEIPEL and FREDERICK MONTAGUE TOWNSHEND LANGE, subjects of the King of Great Britain and Ireland, residing at Southwark, in the county of London, England, have invented Improvements in or Relating to the Control of Electric Motors, of which the following is a specification.

This invention of improvements in or relating to the control of electric motors has reference more particularly to the provision of means whereby the starting of electric motors can be effected in an easier and more effective manner than is now usually the case.

The invention is particularly applicable for use in the starting of motors that are employed to drive heavy machinery, such as printing-machines and gun-turrets, which require the expenditure of a considerable amount of energy to impart the initial turning movement thereto.

In the ordinary practice of starting a motor that is required at first to run slowly, as is necessary, for example, with a printing-machine when making ready, the workman moves the handle of the rheostat over the contacts until the current is sufficient to impart a rotary motion to the armature. If the handle is maintained on the contact onto which it has been moved to start up the motor, the motor will accelerate. This acceleration is not always desired, and to keep the motor turning at a slow speed the workman has to move the rheostat-handle backward toward the zero position in order to prevent acceleration. This method of starting an electric motor is one that it is not always convenient to adopt in practice, and the present invention has for object to overcome the objections that pertain to such a method. For this purpose, according to this invention, a rheostatic device is provided and so arranged that when the handle or contact-maker is moved from the zero or off position the number of volts impressed on the motor-armature is such that the motor can exert a comparatively large torque which will cause a "kick" or impulse to be imparted to the armature, the torque being immediately reduced by the continued movement of the handle or contact-maker in a forward direction and the number of volts impressed on the motor-armature reduced.

Figure 1:
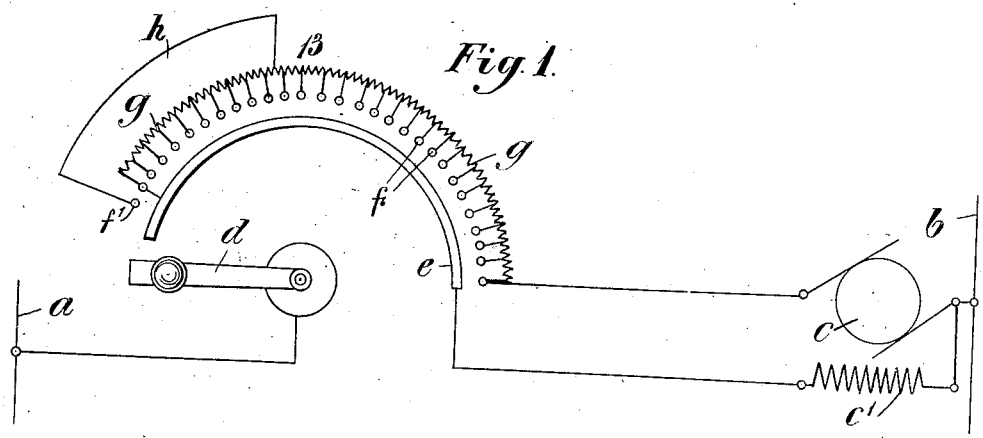

In the accompanying illustrative drawings, Figure 1 is a diagrammatic view of the invention applied in its simplest form. Figs. 2 to 6 are diagrammatic views of modified arrangements and show the invention applied in connection with motors controlled in the manner described in the specification of Patent No. 463,802, dated November 24, 1891, granted to Harry W. Leonard, and in the specification of Patent No. 797,889, dated August 22, 1905, granted to us and G. W. Mascord.

Referring to Fig. 1, $a$ and $b$ are mains that lead from any suitable source of power and from which energy is taken to drive the motor $c\ c'$, which is shown as an ordinary shunt-wound machine. The motor is connected on one side directly to the main $b$ and is on the other side connected to the main $a$ through a rheostatic device. This rheostatic device comprises a hand-operated controlling-lever $d$, a contact $e$, a plurality of main contact-blocks $f$, and a supplementary contact $f'$, over which the lever $d$ can be moved. Contact $e$ is connected to the motor field-winding $c'$, and the contact-blocks $f$ are connected to the motor-armature $c$, the contact-blocks $f$ being connected together through interposed resistances $g$ and the contact $e$ being electrically connected to the first of the main contact-blocks $f$. The supplementary contact-block $f'$ is connected by a lead $h$ to one of the main contact-blocks $f$ in advance thereof. The arrangement is such that when the lever $d$ is moved from the off position it will first close the motor field-circuit and then the armature-circuit. In closing the latter circuit only a part of the resistance controlled by the lever $d$ will be placed in circuit and the amount of resistance thus placed in circuit will be such as will enable a torque to be produced that will impart an impulse or kick to the armature $c$ sufficient to set it in motion. The continued motion of the lever $d$ will cause it to pass from off the supplementary contact-block $f'$ onto the first of the main contact-blocks $f$. This motion will place the whole of the resistance in series with the armature $c$ and the torque will then be reduced to that necessary to keep the armature turning very slowly. The speed of the motor is increased as usual by advancing the lever d over the contact-blocks f until all the resistances g have been cut out of circuit. It will also be seen that with this arrangement it is possible to move the motor round very easily to only a small extent at a time. This is accomplished by imparting to the motor-armature a series of comparatively strong impulses or kicks and is effected by moving the lever d onto the supplementary contact-block f' and then back to the off position, and so on.

In the arrangements shown diagrammatically in Figs. 2 to 6, inclusive, the rheostatic device is shown as inserted in the field-circuit $k^2$ of the generator k of a motor-generator k k', that is used to drive the motor c c' either in the manner described in Leonard's former specification, No. 463,802, of 1891, or in our and Mascord's former specification, No. 797,889, of 1905, hereinbefore referred to.

Figure 2:
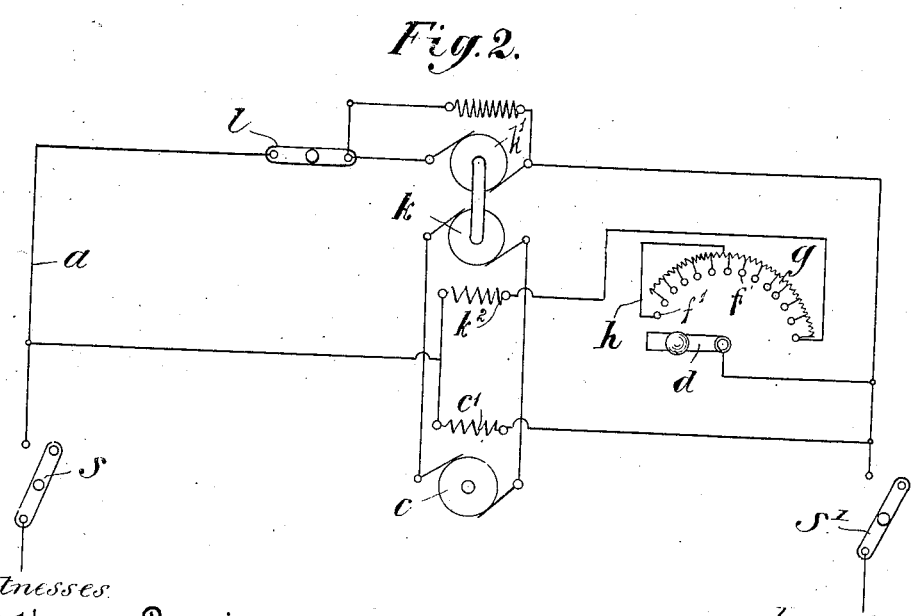

Referring now to Fig. 2, s s' are ordinary main switches, and l represents an ordinary motor-starting switch for the motor k' of the motor-generator. It will be understood that with this arrangement when the switches s s' are closed the field c' will be excited and when the switch l is operated the motor-generator will start running. The effect of then closing the generator field-circuit $k^2$ by moving the lever d onto the supplementary contact f' of the rheostatic device d f f' g h will be to cause the generation of a fairly strong magnetic field, which will in its turn cause the impression of a correspondingly strong electromotive force upon the armature c of the motor c c', with the result that the said armature will have a starting impulse or kick imparted thereto. The next movement of the lever d in a forward direction will reduce the strength of the generator-field $k^2$ and the electromotive force imposed on the armature c so as to be sufficient only to keep the armature c turning very slowly, as before explained. Sometimes the generator-field $k^2$ may be shunted in the usual manner in order to obviate or reduce the inductive spark which may occur when the lever d is moved from the contact-block f' to the off position.

Figure 3:
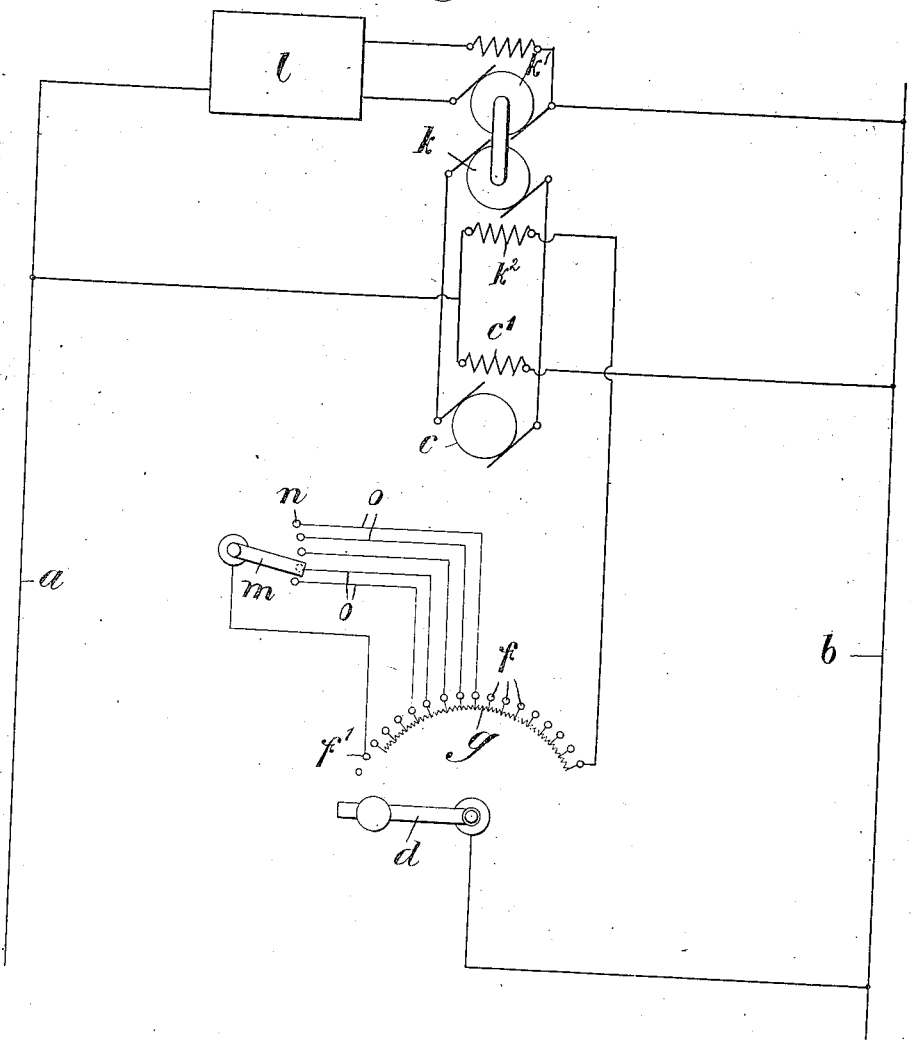

Fig. 3 is a development of the arrangement diagrammatically shown in Fig. 2. In this arrangement the rheostatic device d f f' g is provided with means by which the strength of the starting impulse or kick imparted to the motor may be varied. This arrangement is specially applicable for use in connection with motors that are used to drive printing-machines and other machines in which the amount of energy that is required to impart the starting impulse or kick may vary. In the arrangement shown the contact-block f' instead of being directly connected to one of the contact-blocks f in advance thereof, as in Figs. 1 and 2, is connected to a contact-arm m, that is adapted to be moved over a series of contacts n, each of which is connected by a lead o to one of the contact-blocks f of the rheostatic device. By suitably placing the contact-arm m on one or other of the contacts n the strength of the impulse or kick imparted to the motor c can be made stronger or weaker, as desired or as may be found necessary.

Figure 4:
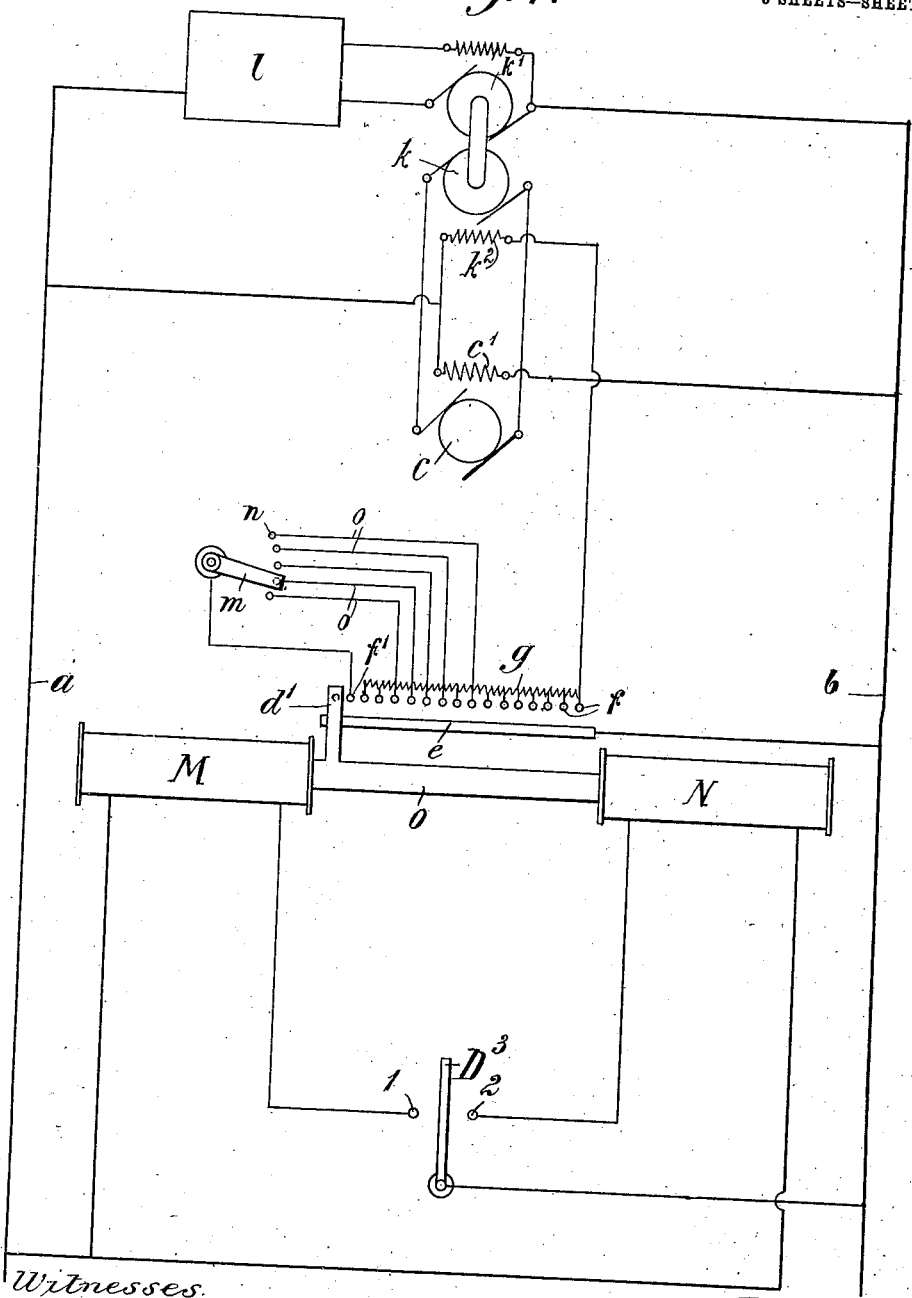

In the modification shown in Fig. 4 the hand-operated controlling-lever d (shown in Figs. 1, 2, and 3) is dispensed with, and there is used in lieu thereof a contact-arm d', that is moved over the contact-blocks f' f of the rheostatic device by the longitudinal movement of an iron core O. This iron core is caused to move endwise in one or other direction by one or other of two solenoids M or N, the circuit of which is closed across the mains a b by the movement of a contact-arm $D^3$, connected to one main—viz., b—onto one or other of two contacts 1 or 2, that are respectively connected, through the solenoids M and N, to the other main a. The arrangement is shown as provided with the device m n o hereinbefore described for regulating the strength of the impulse or kick.

Figure 5:
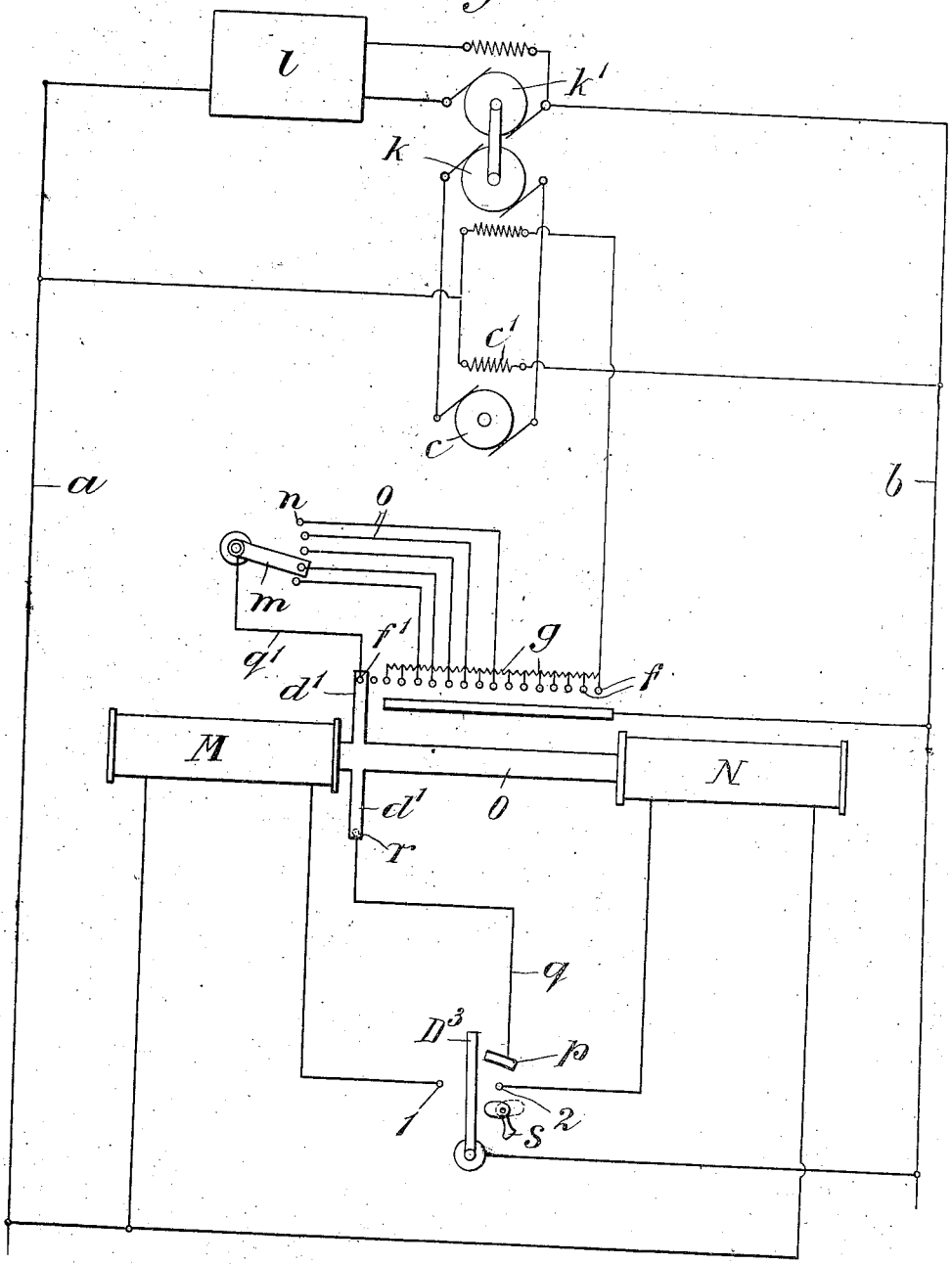

Fig. 5 shows a further development of the invention. In this arrangement the impulse or kick is imparted by a hand-operated switch independently of the solenoically-operated controller. The contact-arm $D^3$ is so arranged that when moved in the direction of the contact 2 it will come in contact with a contact p, that is connected by a lead q to a contact r. On this contact r is adapted to bear the contact-arm d', which at the same time bears upon the supplementary contact f', connected by a conductor q' to the arm m of the impulse-regulating device m n o. s is an eccentric that can be turned into either of two positions. In the position shown in full lines the contact-arm $D^3$ can only be moved into connection with the contact p. By moving the contact-arm $D^3$ onto and off this contact p a series of impulses or kicks can be imparted to the motor. When the eccentric s is moved into its other position, (shown in dotted lines,) the contact-arm $D^3$ can be moved, so as to rest upon the contact 2. As the arm $D^3$ moves over the contact p an impulse or kick will be imparted to the motor-armature c, and when the contact-arm $D^3$ moves onto the contact 2 the solenoid N will be excited, and the iron core O will be moved to the right, thus inserting the full resistance into the generator field-circuit, the resistance being gradually reduced as the core o continues to move to the right.

Figure 6:
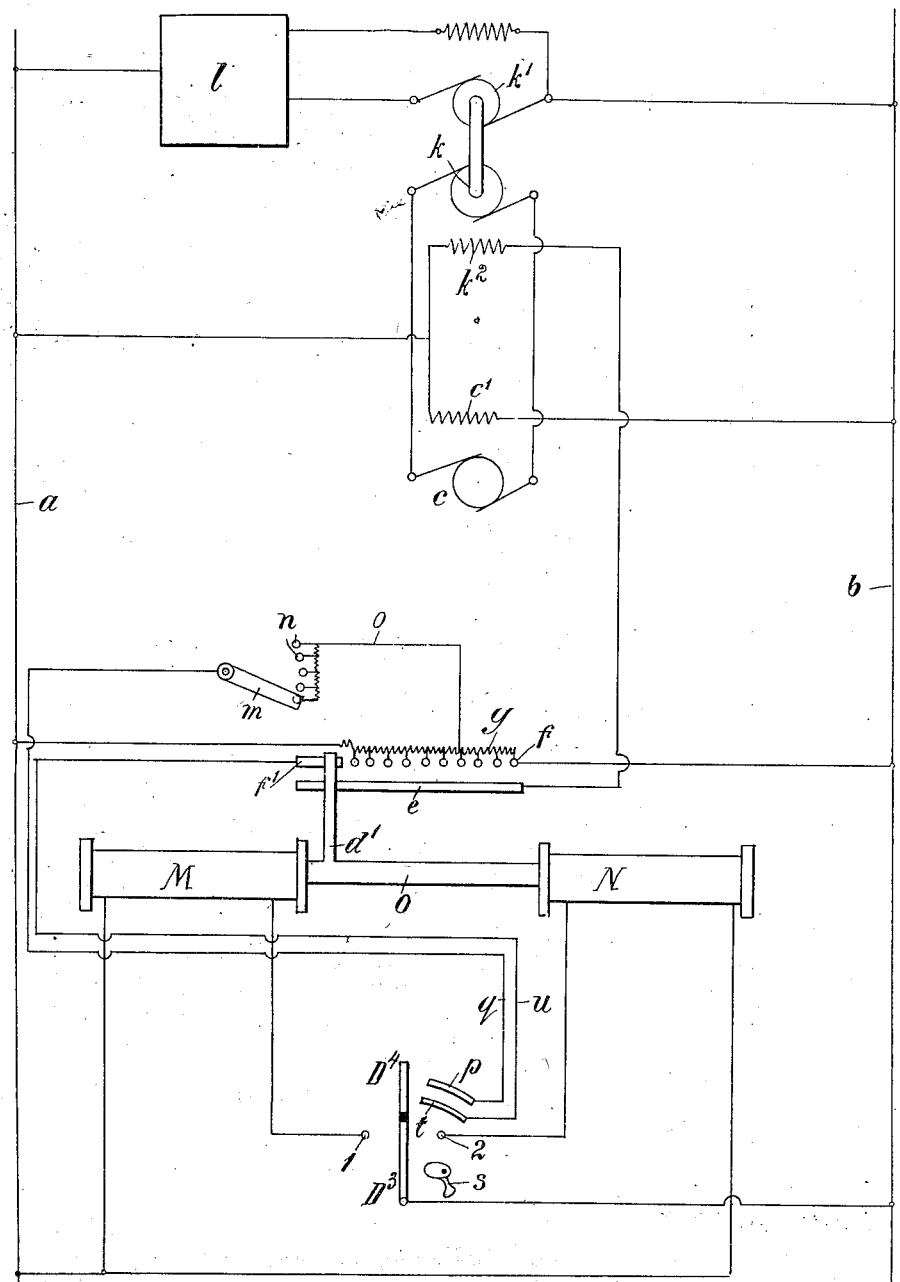

Fig. 6 shows another modification of the invention according to which the generator-field $k^2$ is varied by means of a potentiometer resistance. In this arrangement the resistances g of the rheostatic device are placed directly across the mains a b, and the contact e of such device is directly connected to one end of the field-windings $k^2$ of the generator $k$ of the motor-generator $k\,k'$. The hand-operated contact-arm comprises two parts $D^3$ $D^4$, insulated the one from the other, and the arm is so arranged that when moved in the direction of the contact 2 one part thereof—viz., $D^4$—will first come in contact with a pair of contacts $p\,t$, which are respectively connected by leads $q$ and $u$ to the contact-arm $m$ of the impulse-regulating device $m\,n\,o$ and to the supplementary contact-block $f''$ of the rheostatic device. A circuit will thus be closed across the mains $a\,b$ through the generator field-winding $k^2$ by way of the contacts $e\,d'\,f'$, conductor $u$, contacts $t\,d^4\,p$, conductor $q$, impulse-regulating device $m\,n\,o$, and resistances $g$, and an impulse or kick will be imparted to the motor-armature $c$. When the contact-arm $D^3\,D^4$ is moved onward, the part $D^3$ thereof will come into connection with the contact 2 and the solenoid N will be excited so as to actuate the core O and cause the contact-arm $d''$ to move endwise over the contact-blocks $f$ and contact $e$, whereby the generator field-winding $k^2$ will at first be put in circuit across the mains $a\,b$ through the whole of the resistances $g$, after which such resistances will be gradually cut out by the movement of the arm $d'$ to the right, as in the other arrangements hereinbefore described.

Instead of connecting each of the contacts $n$ of the impulse-regulating device by a separate conductor $o$ to a separate main contact-block $f$, as in Figs. 3, 4, and 5, the several contacts $n$ may be connected together through resistances $n'$ and only the last of them be connected by a conductor $o$ to one of the contact-blocks $f$, as shown in Fig. 6.

What we claim is—

1. For starting and controlling an electric motor, a rheostatic device having a resistance the starting and forward ends of which are arranged remote from each other, and means whereby a portion of such resistance extending from the starting end thereof toward the full-speed end can be put out of effective action at the moment of starting.

2. For starting and controlling an electric motor, a rheostatic device having a resistance the starting and full speed ends of which are arranged remote from each other, and means whereby a portion of such resistance extending from the starting end thereof toward the full-speed end can be short-circuited at the moment of starting.

3. In a rheostatic device, the combination with a resistance therein having its starting and full speed ends remote from each other, of means whereby a variable portion of such resistance can be put out of effective action at the moment of starting.

4. In a rheostatic device, the combination with a plurality of fixed contacts with interposed resistances, the first and last contacts being remote from each other, and a movable contact device arranged to move successively over said contacts from the starting contact to the full-speed contact, of means whereby more of the resistance can be put out of effective action at the moment of starting than will be put out of action immediately after the moment of starting.

5. In a rheostatic device, the combination with a plurality of fixed contacts with interposed resistances, the first and last contacts being remote from each other, and a movable contact device arranged to move successively over said contacts from the starting contact to the full-speed contact, of means whereby a variable number of said resistances can be put out of effective action at the moment of starting.

6. In a rheostatic device, the combination with a plurality of fixed contacts with interposed resistances and a movable contact arranged to work over said fixed contacts, of means for placing said movable contact in connection with a fixed contact in advance of the first one at the moment of starting.

7. In a rheostatic device, the combination with a plurality of fixed contacts with interposed resistances and a movable contact arranged to work over said fixed contacts, of means for placing said movable contact in connection with any one of several of the fixed contacts in advance of the first one at the moment of starting.

8. In a rheostatic device, the combination with a plurality of fixed contacts with interposed resistances, and a movable contact arranged to work over said fixed contacts and cut out the successive resistances, of an electric circuit arranged to bridge a number of the resistances and to be closed by the movable contact at the moment of starting.

9. In a rheostatic device, the combination with a plurality of fixed contacts with interposed resistances, and a movable contact arranged to work over said fixed contacts and cut out the successive resistances, of an electric circuit adapted to bridge a variable number of the resistances and to be closed by said movable contact at the moment of starting.

10. In a rheostatic device, the combination with a plurality of fixed contacts with interposed resistances, and a movable contact arranged to work over said fixed contacts, of a supplementary contact arranged at the rear of and separate from the first fixed contact connected to the resistances and so as to make connection with said movable contact, and means for connecting said supplementary contact to a fixed contact in advance of the first one.

11. In a rheostatic device, the combination with a plurality of fixed contacts with interposed resistances, and a movable contact arranged to work over said fixed contacts, of a supplementary contact arranged at the rear of and separate from the first fixed contact connected to the resistances and so as to make connection with said movable contact, and means whereby said supplementary contact can be connected to any one of several fixed contacts in advance of the first one.

12. In a rheostatic device, the combination with a plurality of fixed main contacts with interposed resistances, and a movable contact arranged to work over said main contacts and cut out the successive resistances, of a supplementary contact arranged at the rear of the first main contact, a number of additional supplementary contacts separately connected to main contacts in advance of the first one, and a second movable contact adapted to be connected to the first-mentioned supplementary contact and to be moved into connection with any one of the additional supplementary contacts.

13. For controlling an electric motor, the combination with a main electric motor, a motor-generator for starting and controlling the armature of said main motor, and electric-supply mains, of a rheostatic device comprising a resistance adapted to be placed in the circuit of the generator field-winding of the motor-generator which is connected to one of said supply-mains, a movable contact adapted to be connected to the other main and to gradually cut out said resistance when moved sufficiently in relation thereto, and means whereby at the moment of starting, a portion of said resistance will be out of effective action.

14. For controlling an electric motor, the combination with a main electric motor, a motor-generator for starting and controlling the armature of said main motor, and electric-supply mains, of a rheostatic device comprising a resistance adapted to be placed across the mains through the generator field-winding of the motor-generator, a movable contact for gradually cutting out said resistance, and means whereby said movable contact can be connected to said resistance at a point between its ends at the moment of starting, said contact afterward acting by continued movement, to place the whole of the resistance in circuit and then to gradually reduce the amount thereof in circuit.

15. For controlling an electric motor, the combination with a main electric motor, a motor-generator for starting and controlling the armature of said main motor, and electric-supply mains, of a rheostatic device comprising a plurality of fixed main contacts with interposed resistances that are adapted to be placed in the circuit of the generator field-winding of the motor-generator which is connected to one of the said supply-mains, a supplementary contact arranged at the rear of the first main contact and adapted to be connected to a contact in advance of the first main contact, and a movable contact for connection with the other supply-main and arranged so that at starting it will first make connection with the supplementary contact and afterward, by continued movement, with the successive main contacts.

16. For controlling an electric motor, the combination with a main electric motor, a motor-generator for starting and controlling the armature of said main motor, and electric-supply mains, of a rheostatic device comprising a plurality of fixed main contacts with interposed resistances that are adapted to be placed in the circuit of the generator field-winding of the motor-generator which is connected to one of the said supply-mains, a supplementary contact arranged at the rear of the first main contact, additional supplementary contacts separately connected to main contacts in advance of the first one, a movable contact connected to the first-mentioned supplementary contact and adapted to be placed in connection with any one of said additional supplementary contacts, and a second movable contact adapted to be placed in connection with the other supply-main and to work over the first-mentioned supplementary contact, and over the main contacts.

17. For controlling an electric motor, the combination with a main electric motor, a motor-generator for starting and controlling the armature of said main motor, and electric-supply mains, of a rheostatic device comprising a plurality of fixed contacts with interposed resistances adapted to be placed in the circuit of the generator field-winding of the motor-generator, a movable contact adapted to form part of said circuit and by movement to gradually cut out said resistances, means adapted to cut out a portion of said resistances at the moment of starting, a double-acting electromagnetic device for moving said movable contact alternately in opposite directions, and means for controlling the movement of said electromagnetic device.

18. For controlling an electric motor, the combination with a main electric motor, a motor-generator for starting and controlling the armature of said main motor, and electric-supply mains, of a rheostat comprising a plurality of fixed main contacts with interposed resistances connected at one end to the field-winding of the generator portion of said motor-generator which is connected to one of said supply-mains, a fixed contact-bar connected to the other supply-main, a supplementary fixed contact arranged at the rear of and separate from the first main contact, additional supplementary contacts separately connected to main contacts in advance of the first one, a movable contact connected to the first-mentioned supplementary contact and adapted to be brought into connection with any one of the additional supplementary contacts, another stationary contact, means whereby the latter contact can be connected, at will, to the supply-main to which said contact-bar is connected, a second movable contact adapted at starting to connect the last-mentioned stationary contact to the first-mentioned supplementary contact, a pair of solenoids with movable core connected to said second movable contact, and means whereby the circuit of either of said solenoids can be closed, at will, across said supply-mains.

19. For controlling an electric motor, the combination with a main electric motor, a motor-generator for starting and controlling the armature of said main motor, and electric-supply mains, of a rheostat comprising a plurality of fixed main contacts with interposed resistances connected at one end to the field-winding of the generator portion of said motor-generator which is connected to one of said supply-mains, a fixed contact-bar connected to the other supply-main, a supplementary fixed contact arranged at the rear of and separate from the first main contact, additional supplementary contacts separately connected to main contacts in advance of the first one, a movable contact connected to the first-mentioned supplementary contact and adapted to be brought into connection with any one of the additional supplementary contacts, another stationary contact, a second movable contact adapted at starting to connect the last-mentioned stationary contact to the first-mentioned supplementary contact, a pair of solenoids with movable core connected to said second movable contact, and a switch device having a movable contact whereby said stationary contact can be connected to the supply-main to which said contact-bar is connected, and whereby the circuit of either of the solenoids can be closed across said mains.

20. In a rheostatic device, the combination with a resistance device and a movable contact whereby successive portions of said resistance can be cut out of circuit, of a supplementary circuit arranged to be closed by said movable contact at starting and whereby said contact will then be connected to an intermediate part of said resistance, and an adjustable impulse-regulating device located in said circuit.

21. For controlling an electric motor, the combination with a main electric motor, a motor-generator for starting and controlling the armature of said main motor, and electric-supply mains, of a rheostatic device comprising a resistance adapted to be placed across the mains through the generator field-winding of the motor-generator, a movable contact for gradually cutting out said resistance, a supplementary circuit arranged to be closed by said movable contact at starting and whereby said contact can then be connected to said resistance between the ends thereof, and an adjustable impulse-regulating device located in said circuit.

Signed at London, England, this 20th day of December, 1905.

WILLIAM GEIPEL.
FREDERICK MONTAGUE
    TOWNSHEND LANGE.

Witnesses:
  H. D. JAMESON,
  F. L. RAND.